H. L. BELL.
CULTIVATOR.
APPLICATION FILED FEB. 12, 1914.

1,108,319.

Patented Aug. 25, 1914.
2 SHEETS—SHEET 1.

Witnesses
H. C. Robinette
J. T. Mawhinney

Inventor
Harry L. Bell

By Munn, Cushman & Rea
Attorneys

H. L. BELL.
CULTIVATOR.
APPLICATION FILED FEB. 12, 1914.

1,108,319.

Patented Aug. 25, 1914.
2 SHEETS—SHEET 2.

Witnesses
H. C. Robiette
J. J. Mawhinney

Inventor
Harry L. Bell

By  
Attorneys

UNITED STATES PATENT OFFICE.

HARRY L. BELL, OF NORFOLK, VIRGINIA.

CULTIVATOR.

1,108,319. Specification of Letters Patent. Patented Aug. 25, 1914.

Application filed February 12, 1914. Serial No. 818,342.

*To all whom it may concern:*

Be it known that I, HARRY LAYFIELD BELL, a citizen of the United States, residing at Norfolk, in the county of Norfolk and State of Virginia, have invented new and useful Improvements in Cultivators, of which the following is a specification.

This invention relates to cultivators, and has for an object to provide an improved implement of this character for use particularly in trucking and to take the place, to a large extent, of wheel hoes, wheel rakes, and other forms of hand operated and animal drawn implements heretofore employed in this particular line of cultivation.

The implement of this invention is designed for destroying grass, weeds and the like, and for cultivating vegetables grown in single or multiple rows or drills on beds, the present device being particularly adapted for spinach and lettuce growing.

Another important object of this invention is to provide a device which will destroy the young fine grass and weeds not only between the drills on the truck beds, but also on the sides of the beds, and to provide a device which may be adjusted to beds of various widths and to rows or drills spaced apart at various distances on the beds.

The present invention relates particularly to the frame or body of the cultivator which is adapted particularly for carrying and operating the rotary earth working implement set forth in the copending divisional application, Serial No. 834,657, filed April 27, 1914.

Various other objects and advantages of this cultivator will appear from the following specific disclosure of one embodiment of this invention, the same being illustrated in the accompanying drawings in which—

Figure 1:
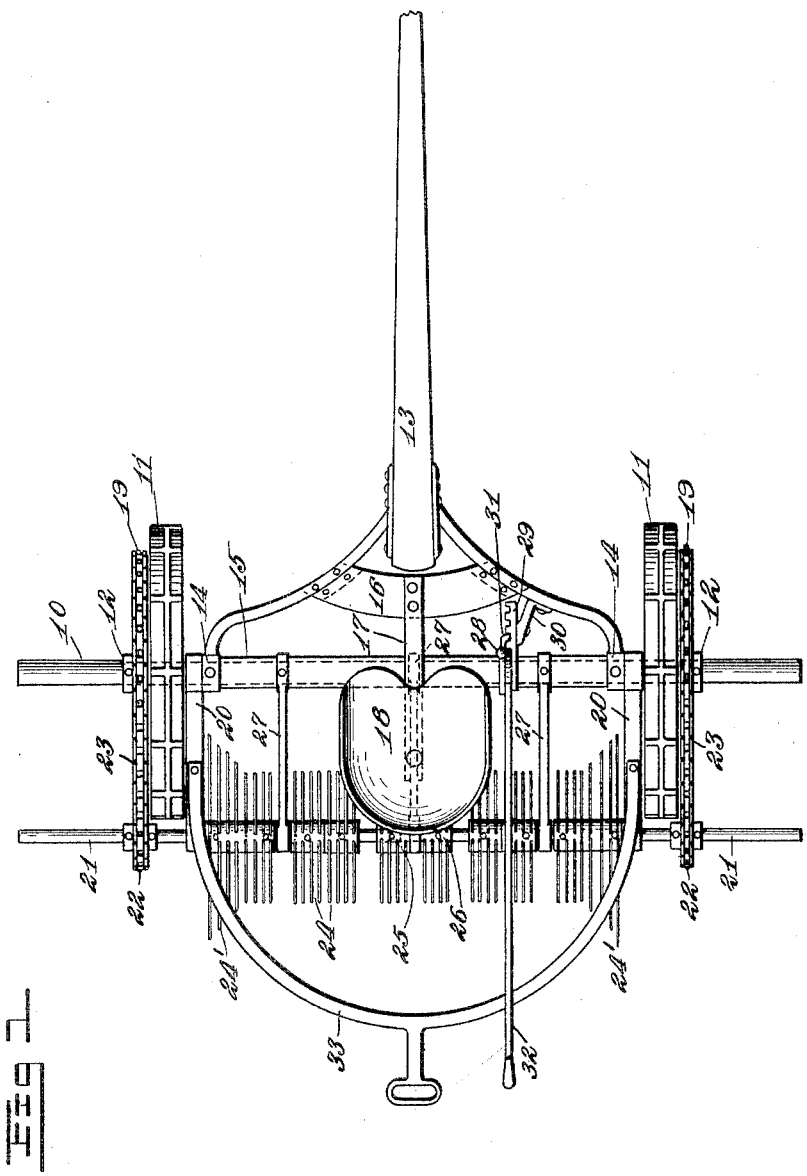
Figure 2:
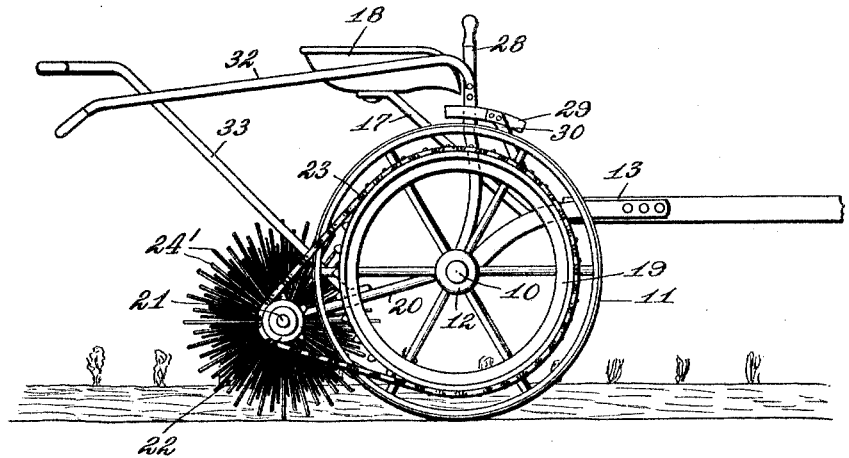
Figure 3:
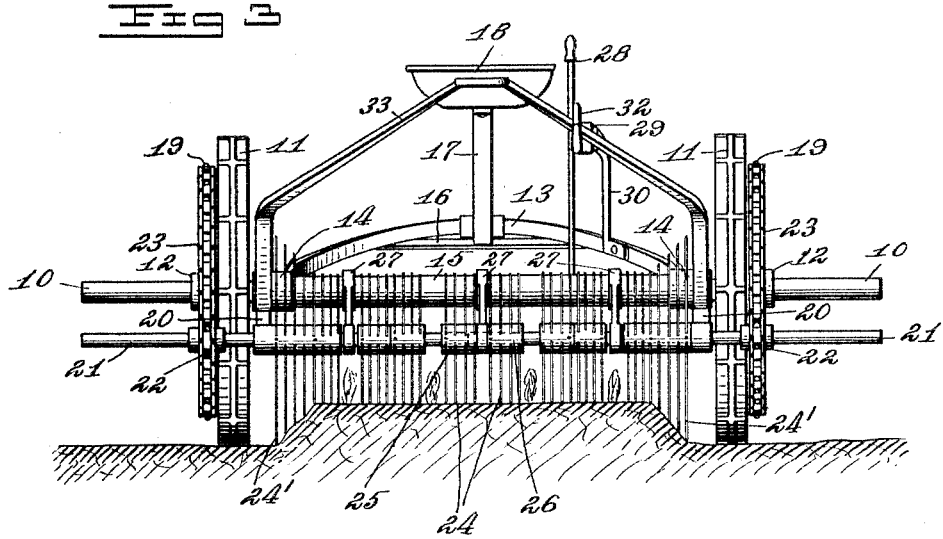

Figure 1 is a top plan view of the cultivator. Fig. 2 is a side elevation of the same. Fig. 3 is a rear elevation of the cultivator.

Referring to these drawings the frame of the cultivator comprises an axle 10 supported at its opposite ends upon traction wheels 11 loose upon the axle 10. The wheels 11 are held upon the axle by collars 12 suitably fixed in adjusted position upon the axle by set screws as shown, or any other fastening means. The axle 10 carries the inner end of a tongue 13 having collars 14 secured to the axle 10 by set-screws or the like as shown. Between the collars 14 of the tongue, and mounted on the axle 10, is an elongated sleeve 15, the ends of which bear against the inner sides of the collars 14 whereby the sleeve is held from longitudinal displacement upon the axle. A plate 16 is carried in a horizontal position upon the inner end of the tongue 13 and has secured thereto the end of a seat post 17 extending upwardly and rearwardly from the plate 16 and carrying upon its upper end a suitable seat 18. The wheels 11 are each provided upon their outer sides with a sprocket wheel 19 fixed to the traction wheel 11 so as to turn therewith.

The frame of the cultivator is provided with a pair of hangers 20 mounted to turn freely upon the axle 10 and arranged preferably near the inner sides of the wheels 11. In the outer ends of the hangers 10 is revolubly mounted a shaft 21 arranged in parallelism with the axle 10 and extending entirely across the machine. Small sprockets 22 are arranged one near each end of the shaft 21 and in alinement with the large sprockets 19. Chains 23 are carried on the sprockets 19 and 22 whereby the rotation of the traction wheels turn the shaft 21. Adjustably mounted on the shaft 21 are a plurality of spring wire brushes 24, the hubs of which are secured to the shaft 21 by set-screws or the like after the brushes have been adjusted to the desired positions upon the shaft. From Figs. 1 and 3 it will be noted that the inner or middle brushes 24 are provided with hubs made in two sections, 25 and 26, and that each section is provided with a fastening device such as a set-screw whereby the hub sections may be secured close together as shown in Fig. 3, or may be separated or spaced apart on the shaft 21, for a purpose which will hereinafter appear. In order that the traction wheels 11 may turn freely, the shaft 21 is made in two sections, the same meeting in the hub of the middle brush, the hub section 25 being shown as supporting the meeting ends of the sections of the shaft 21.

It is well known that in trucking the beds are raised from the ground and that the sides of the beds slope rather abruptly from the top of the bed to the ground. This improved cultivator is adapted to straddle one of these beds, the wheels 11 traveling in the alleys between the beds. In order to pulverize the earth at the sides of the bed, as well as on top of the same and to remove the grass and weeds from the sides of the beds, the brushes or cultivator members of this machine have their peripheries so shaped as to conform to the top and sides of the beds. As shown in Fig. 3 the end brushes 24' have the wires thereof consecutively increased in length from about the intermediate portion of the brush to the outer end thereof whereby an outwardly flaring periphery to the brush is formed. These elongated wires or bristles on the brush operate upon the sloping sides of the bed and thus treat the soil forming the sides in the same manner as do the remaining brushes treat the top of the bed between the rows or drills.

For the purpose of adjusting the shaft 21 and the brushes vertically, so as to insure the proper adjustment of the brushes over the bed, the sleeve 15 carried upon the frame is provided with one or more arms 27 which are adjustably fixed to the sleeve 15 by set screws or the like as shown, and which have transverse bearings in their outer ends through which the shaft 21 freely passes. It is preferable to provide three of these arms 27, as shown in Fig. 3, one for each of the shaft sections, so that the sections of the shaft 21 may be raised without throwing the same out of alinement. The sleeve 15 has fixed thereto a hand lever 28 extending upwardly into proximity with the seat 18 and is adapted to move against one side of a sector 29 fixed to the tongue 13 by a brace 30, or the like. The hand lever 28 is locked to the sector by the usual dog or pawl 31 engaging the teeth of the sector. It is thus seen that by swinging the lever 28 forward the arms 27 are raised so as to raise the shaft 21 and the brushes mounted thereon.

In the use of this cultivator the collars 12 are loosened on the axle 10 and the traction wheels 11 are spaced apart sufficiently so as to travel in the alleys between the beds. The collars 12 are now fixed against the opposite sides of the traction wheels 11 so as to hold the same in adjusted position. The sprockets 22 on the axle sections 21 are now brought into alinement with the sprockets 19 on the traction wheels and secured by set screws in adjusted position. The brushes 24 are now adjusted upon the shaft 21 so as to leave spaces between the brushes for the rows or drills, the end brushes 24 being adjusted to engage over the top edges of the bed and against the sloping sides thereof. If found necessary the intermediate brushes 24 may be divided by separating the hub sections 25 and 26 thereof so as to accommodate a larger number of rows or drills on the bed particularly when the rows or drills are rather close together. It is of course understood that any desired number of the brushes 24 may be placed upon the shaft 21 so as to accommodate the cultivator to beds varying in width and to rows or drills of any number on the bed and spaced at various distances apart.

The machine or implement is adapted to be drawn by a pair of draft animals, the same working in the alleys at either side of the bed. As the traction wheels 11 turn they rotate the sections of the shaft 21 through the chain connection 23 and sprockets 19 and 22 at the opposite sides of the cultivator. The brushes 24 are rotated at a relatively high rate of speed and are so adjusted as to engage in the bed sufficiently to break up and pulverize the earth and to lift out and destroy the fine grass and weeds growing on the bed.

It not infrequently happens that the rows or drills of the truck beds do not lie in true straight lines, and under these conditions it is impossible to draw the cultivator over the bed and direct the brushes between the rows or drills without injuring the plants. To overcome this difficulty the improved cultivator is provided with an extension lever 32 secured to the hand lever 28 and extending rearwardly therefrom whereby the operator of the cultivator may walk behind the implement and control the height of the brushes without necessarily being seated. To further control the implement when the operator is walking, the hangers 20 are provided with a yoke 33 extending rearwardly and upwardly from the hangers and terminating at its middle portion in a rearwardly and horizontally extending handle adapted to be grasped by the operator to swing the implement sidewise to direct the brushes in between the plants when irregular.

What is claimed is—

1. In a cultivator, a frame, an axle on the frame, hangers on the axle, a shaft journaled in the free ends of the hangers, traction wheels mounted on the axle adapted for adjustment toward and from each other, driving means between the axle and the shaft and adapted for adjustment with the traction wheels, a transversely extensible rotary earth working implement mounted on the shaft, and adjusting means on the frame engaging the shaft whereby to raise and lower the same.

2. In a cultivator, a frame, an axle on the frame, a shaft on the frame, an earth working implement mounted on the shaft adapted to be transversely extended, traction wheels mounted on the axle, and driving means between the shaft and the axle for driving the shaft upon the rotation of said wheels, said wheels and said driving means being adjustable toward and from each other on the axle and the shaft whereby to accommodate the various adjustments of the earth working implement.

3. In a cultivator, a shaft, an earth working implement on said shaft, a frame, a plurality of hinged arms on the frame having bearings in their outer ends for the reception of said shaft, a handle connected to said arms for raising and lowering the same, traction wheels on the frame adapted for adjustment toward and from each other, and rotating means on the frame connected to said traction wheels and to said shaft whereby to rotate the latter upon the movement of the traction wheels, said rotating means being adjustable with said traction wheels and upon said shaft to accommodate the rotating means to the adjustment of the wheels and the width of said implement.

4. In a cultivator, a frame, an axle on the frame, a shaft mounted for adjustment in the frame, a laterally extensible earth working implement on the shaft, traction wheels on the axle, and driving connections between the traction wheels and the opposite ends of said shaft for turning the latter, said wheels and said driving means being laterally expansible whereby to accommodate the adjustments of said earth working implement.

In testimony whereof I have hereunto set my hand in presence of two subscribing witnesses.

HARRY L. BELL.

Witnesses:
T. D. SAVAGE,
J. M. CURRIE.

---

Copies of this patent may be obtained for five cents each, by addressing the "Commissioner of Patents, Washington, D. C."